May 6, 1924.
C. E. CROWNOVER
1,492,835
DEMOUNTABLE RIM
Filed April 13, 1922  2 Sheets-Sheet 1
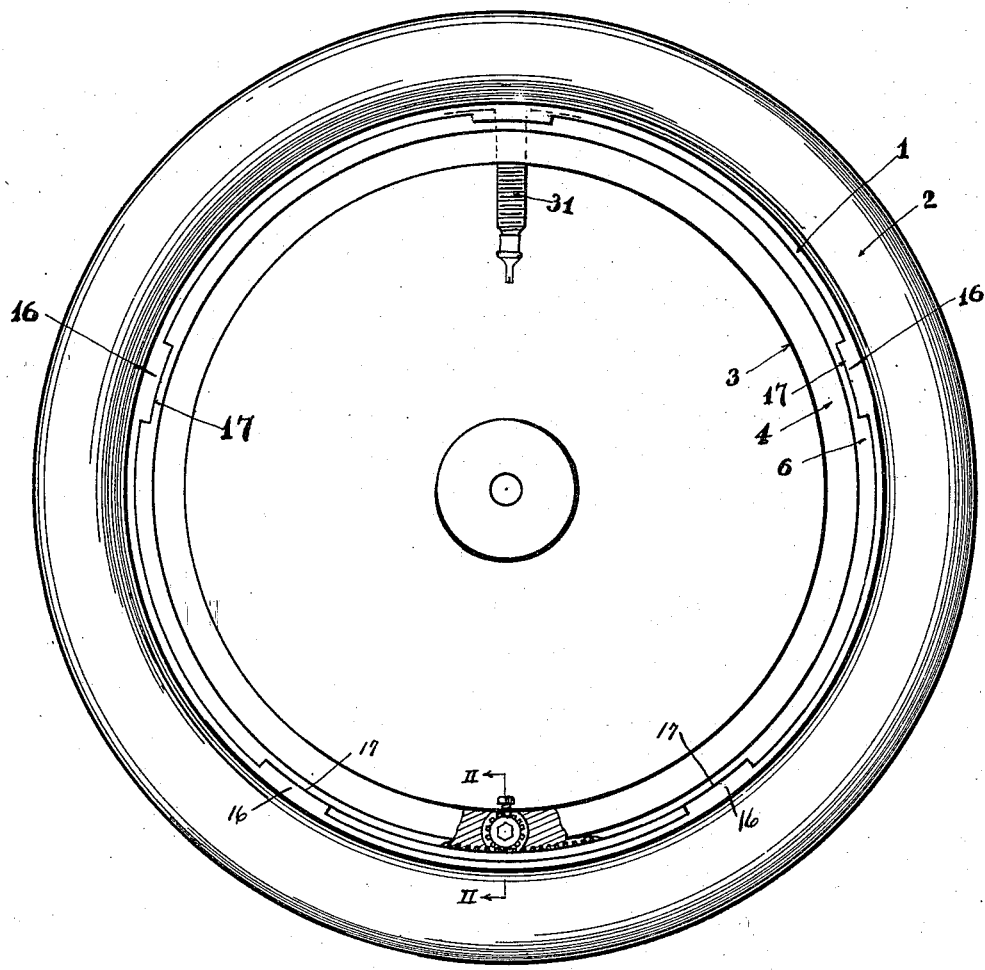
FIG. I
FIG. II
INVENTOR
C.E. CROWNOVER
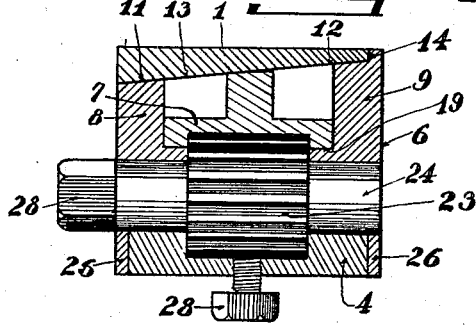
ATTORNEY May 6, 1924.
C. E. CROWNOVER
DEMOUNTABLE RIM
Filed April 13, 1922   2 Sheets-Sheet 2
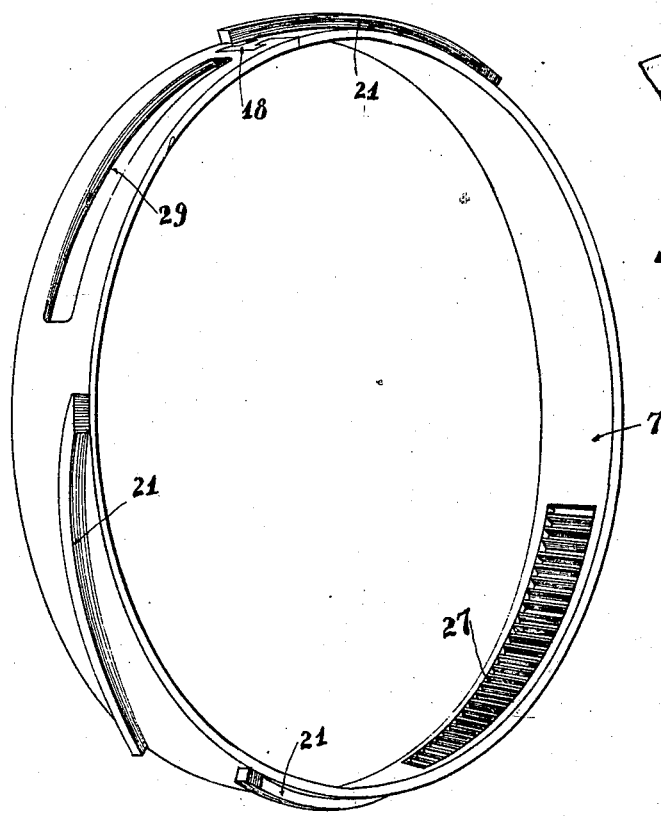
Fig. III
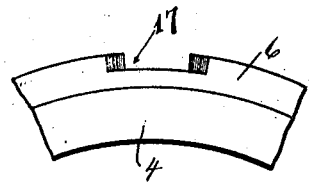
Fig. IV
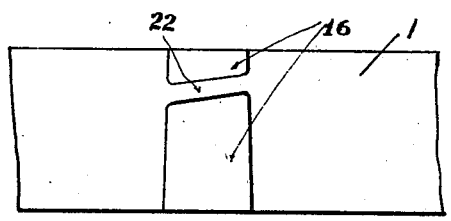
Fig. V
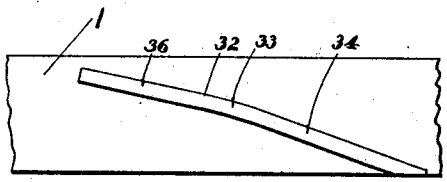
Fig. VI
INVENTOR
C.E.CROWNOVER
BY
ATTORNEY Patented May 6, 1924.

1,492,835

UNITED STATES PATENT OFFICE.

CHARLES E. CROWNOVER, OF YAKIMA, WASHINGTON.

DEMOUNTABLE RIM.

Application filed April 13, 1922. Serial No. 552,089.

*To all whom it may concern:*

Be it known that I, CHARLES E. CROWNOVER, a citizen of the United States, and a resident of Yakima, county of Yakima, and State of Washington, have invented a new and useful Demountable Rim, of which the following is a specification.

The present invention refers to improvements in demountable rims and its particular object is to provide means in combination with a demountable rim that will facilitate the operation of securing the rim on the wheel and of removing the same. A further object of the invention is to provide means allowing both operations to be performed by the use of a wrench only, no other tools being required. A further object of the invention is to part with any individual elements, such as bolts or lugs as they are now commonly used. A further object of the invention is to provide means whereby the rim is slipped on the wheel evenly throughout its circumference, and finally to provide means whereby an enormous pressure can be applied for forcing the rim in its place.

With these objects in view I have illustrated the preferred form of my invention in the accompanying drawings, in which Figure 1 shows a side elevation of a wheel with the rim attached thereto; Figure 2 a cross section through the same along line 2—2 of Figure 1; Figure 3 a perspective detail view of a ring used as a driving member in my combination; Figure 4 a detail view of a portion of the wheel felloe; Figure 5 an inside view of a portion of the rim looking at it from the center of the wheel, and Figure 6 a detail view of a modified form of a ring looking at it from the outside. While I have illustrated only the preferred form of my invention I wish to have it understood that various changes or modifications may be made within the scope of the claims hereto attached without departing from the spirit of the invention.

My combination comprises principally three parts, the rim (1) carrying the tire (2); the wheel (3) including a wooden felloe (4), a felly band (6) surrounding the same, and the ring (7) interposed between the latter felloe and the rim.

The felly band (6) is provided with two flanges (8) and (9) extending outwardly and presenting slanting or conical surfaces (11) and (12) adapted to receive the corresponding conical inner surface (13) of the rim (1), a projection (14) on the flange (9) forming a stop for the rim. As shown in Figure 5 and Figure 1, the rim is provided on its inner surface with a plurality of transverse lugs (16) evenly distributed over the surface. The flanges of the felly band (6) are provided with corresponding grooves (17) adapted to receive these lugs. Both lugs and grooves are preferably tapered as shown in Figures 5 and 4. It will be seen from the details thus far described that the rim can be engaged with the wheel by being slipped on the same from one side, the lugs (16) fitting into the grooves (17). Since the rim and the felly band present conical or slanting surfaces to each other, it will be seen that during the beginning of the operation there is ample play between the two, and no difficulty will be met in bringing about an initial engagement of the two members.

To provide means for firmly forcing the rim into engagement with the felloe, I provide the ring (7), which is spliced in any suitable manner, as shown at (18), and which may be placed in the annular groove (19) formed between the two flanges (8) and (9) of the metal rim. This ring is provided with a plurality of external threads (21), one for each lug (16), and adapted to engage a slot (22) in said lug upon being turned on its axis. The turning motion is brought about by means of a pinion (23) mounted on a shaft (24) secured in the felloe (4) fortified by downwardly extending flanges (26) of the felly band (6). This pinion is in mesh with an internal gear (27) on the ring and when the pinion is rotated with the aid of a wrench engaging the angular extension (28) of the shaft (24), the ring (7) will be turned in its seat during which operation the threads (21) on its outer circumference engage the slots (22) in the lugs (16) and thereby force the rim on its seat. To lock the rim after it is seated, I provide a setscrew (28) which prevents the pinion from rotating and thereby locks the whole device.

It will be understood that in this device the ring is the only member that revolves, the rim as well as the wheel remaining stationary, and the ring must therefore be provided with a suitable slot (29) through which the valve stem (31) extends, and which at the same time serves to limit the revolving motion of the ring indicating thereby to the operator whether the ring is in its proper starting or final position.

The operation of the device is as follows: The wheel is placed in the ordinary position, the hole for the valve being on top. The valve stem is then inserted through the holes in the felloes, which are provided as usual, and the slot (29) in the ring. The lugs (16) at this time register with the grooves (17) and are pressed into the same until the slots (22) register with the threads (21) on the ring (7). Since the two engaging surfaces of the felly band and the rim are conical shaped, little pressure is needed to get the rim into this position. Then a wrench is applied to the extension (28) of the shaft (24) whereby the pinion (23) is rotated transmitting its motion to the ring (7). The threads on the latter engage the recesses (22) in the lugs (16), and while the ring (7) is turned gradually force the rim into ts final position. It will be readily understood that an enormous pressure can be brought to bear in this manner, which pressure actuates practically all of the rim at the same time. After the operation is completed the setscrew (28) is engaged with the pinion (23) whereby the combination is locked.

Figure 6 shows a slight modification in the form of the threads. While the threads (21) shown in Figure 3 are of helical form, the threads (32) are bent at (33) offering a forward portion (34) of rather high pitch and a rearward portion (36) of less pitch, which would mean that during the beginning of the operation of the ring higher speed and less power is obtained, while toward the end of the operation the power is increased at the expense of speed.

To remove the tire rim it is only necessary to loosen the setscrew, turn the pinion in the opposite direction until the ring comes to a stop due to the fact that the end of the slot (29) strikes the valve stem (31), at which time the rim may be easily removed by hand.

I claim:

1. In combination, a wheel having a channel shaped felly band therearound with the ribs turned outwardly and their edges slanted transversely and a series of transverse grooves in one of the ribs only, a tire rim having a correspondingly slanting inner face and internal transverse lugs projecting therefrom adapted to pass laterally into the transverse grooves in the rib of the felly band, and thereby lock the rim against rotative movement relative to the band and means for forcing the rim laterally on the felly band comprising a split ring disposed in the channel space having a plurality of thread members formed thereon adapted to engage the transverse lugs for imparting lateral motion to the same when the ring is rotated.

2. In combination, a wheel having a felly band thereon with an outer face slanting transversely and a central peripheral groove therein, a tire rim having a correspondingly slanting inner face and internal lugs adapted to pass through transverse grooves in the felly band and means for forcing the rim on the felly band comprising a ring disposed in the peripheral groove having a plurality of thread members formed thereon adapted to engage the lugs for imparting lateral motion to the same when the ring is rotated, said threaded members changing their pitch intermediately of their length for increasing the power toward the end of the operation.

3. Means for mounting a tire rim on a wheel comprising conical engaging surfaces for the rim and the wheel, internal lugs associated with the rim, a ring rotatably mounted in the wheel circumference having screw threads thereon adapted to engage the lugs for forcing the rim on the wheel, and means for rotating the ring comprising internal gear teeth on the ring and a pinion rotatably mounted in the wheel felloe engaging the teeth having an angular shaft extension associated therewith whereby it may be manipulated, and a setscrew engaging the pinion for locking the same.

4. Means for mounting a tire rim on a wheel comprising conical engaging surfaces for the rim and the wheel, internal lugs associated with the rim, a ring rotatably mounted in the wheel circumference having screw threads thereon adapted to engage the lugs for forcing the rim on the wheel, and means for rotating the ring, a longitudinal slot in the ring engaging the tire valve so as to limit the movement of the ring.

CHARLES E. CROWNOVER.